(12) United States Patent
Nolan et al.

(10) Patent No.: US 6,676,336 B2
(45) Date of Patent: *Jan. 13, 2004

(54) MULTI-PART DOVETAIL REPAIR BROACH ASSEMBLY AND METHODS OF USE

(75) Inventors: John Francis Nolan, Latham, NY (US); Ralph Arnold Pollock, Ballston Lake, NY (US); Todd Joseph Fischer, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 09/986,986

(22) Filed: Nov. 13, 2001

(65) Prior Publication Data

US 2003/0091399 A1 May 15, 2003

(51) Int. Cl.⁷ ................................................ B23D 37/00
(52) U.S. Cl. ............................ 407/13; 407/19; 407/15
(58) Field of Search ............................. 407/13, 15, 19, 407/18, 16; 409/244; 416/201; 29/889.21

(56) References Cited

U.S. PATENT DOCUMENTS

| 2,585,832 A | * | 2/1952 | Phaneuf | 407/17 |
| 3,662,443 A | * | 5/1972 | Schmidt | 407/17 |
| 4,243,347 A | * | 1/1981 | Clapp et al. | 407/15 |
| 5,135,339 A | * | 8/1992 | Kelm et al. | 472/116 |
| 5,352,068 A | * | 10/1994 | Roseliep | 407/15 |
| 6,551,032 B1 | * | 4/2003 | Nolan et al. | 407/13 |

* cited by examiner

Primary Examiner—Willmon Fridie, Jr.
(74) Attorney, Agent, or Firm—Nixon & Vanderhye

(57) ABSTRACT

The broach assembly includes alternate spacers and cutters arranged in a sub-assembly having a lead at a leading end and a lag at a trailing end. The cutters have side margins in excess of the margins of the spacers for cutting material from the dovetail slots of the turbine wheel as the broach assembly passes through the slots. The bottom or apices of each spacer and cutter are tapered to form a continuously tapered surface along the bottom of the broach assembly. Upon passing the broach assembly through the slot, the assembly is progressively displaced in a radial outward direction to progressively cut the active dovetail slot surfaces. Shims may be disposed in the bottom of the slot to further displace the broach assembly radially outwardly in multiple passes.

25 Claims, 6 Drawing Sheets

MULTI-PART DOVETAIL REPAIR BROACH ASSEMBLY AND METHODS OF USE

BACKGROUND OF THE INVENTION

The present invention relates to a broach assembly for cutting surfaces in a slot and particularly relates to a broach assembly for use in a turbine for cutting active surfaces of dovetail slots and methods of cutting the slots.

Various machined configurations used for fitting or attachment of fixed or movable parts frequently wear as a function of time and use. For example, mating dovetails are generally employed on the wheels and buckets of a turbine for securing those parts to one another. Conventionally, shapers, planers and milling machines are utilized to form the original dovetails. In a gas turbine, the wheels form separate or discrete parts which are assembled to form the rotor. Once assembled, the original tools utilized to form the dovetail slots cannot be used to repair the slots in assembly, principally due to the proximity of the wheels to one another. Similarly, the dovetail slots on the wheels of steam turbines cannot be readily repaired using such tools for like reasons. Also, the turbines are typically on-site in an electric utility and appropriate machine tools to effect repairs of this type are typically not available at those sites.

Over time and use, it will be appreciated that the contact surfaces between the dovetail slots and the dovetails on the buckets require refurbishing. For example, galling typically occurs where one surface chafes against another, causing spalling and general disruption of the mating surfaces. In the context of turbines, the wheel dovetail slot and bucket dovetail have active (contact) and inactive surfaces. The active surfaces of the dovetail slot and bucket dovetail are those surfaces which engage one another as a result of rotation of the rotor. Inactive surfaces of the dovetail slot and bucket dovetail are those surfaces which are only lightly engaged or spaced from one another while the rotor rotates during active use of the turbine. The active surfaces are typically disrupted over time and use and thus require refurbishment.

BRIEF DESCRIPTION OF THE INVENTION

In accordance with a preferred embodiment of the present invention, there is provided a multi-part broach assembly for cutting the surfaces of a slot, for example, the active surfaces of a dovetail-shaped slot of a turbine rotor to reestablish these surfaces, contact areas and clearances on axial entry dovetail rotors. The broach assembly is of a size and configuration enabling its use with respect to the turbine wheels in situ. The broach assembly is also self-aligning and can be fabricated inexpensively using conventional technologies. Particularly, the broach assembly comprises a plurality of cutters and spacers each having the general dovetail configuration of the slot in which the active surfaces are to be refurbished. The spacers and cutters are preferably alternately assembled to form a sub-assembly with a lead and a lag also having the general dovetail configuration of the slot through which the broach assembly will be passed to refurbish the active surfaces of the slot. Preferably, a draw bolt is passed through aligned openings of the lead, lag, cutters and spacers. Apertures are also provided on the cutters, spacers, lead and lag for receiving alignment rods on opposite sides of the draw bolt whereby, in assembly, the lead, lag, cutters and spacers are fixed relative to one another. Except along a tapered side of the sub-assembly of cutter and spacers as described below, the margins of the spacers are preferably inset from the margins of the adjacent cutters. The margins of the lead are generally smaller than the margins of the following spacer to facilitate lead-in to the slot undergoing repair. The margins of the lag generally correspond to the margins of the preceding cutter and the lag thus precludes lateral skewed movement of the broach assembly upon completing a pass through a slot undergoing repair.

The broach assembly is designed for multiple passes through the slot, with each pass or plurality of passes progressively cutting the active surfaces of the dovetail slot. To accomplish this, a side, i.e., a bottom side of each spacer and cutter which faces generally in an opposite direction from the direction in which the cutting edges on the cutters face, is tapered. These bottom sides are progressively tapered in the sub-assembly of spacers and cutters in a direction from the lead to the lag. More particularly, each tapered surface of each spacer lies along an apex or bottom side of the spacer, i.e., the exposed surface extending between the narrowest portion of the spacer. Similarly, each tapered surface of each cutter lies along an apex or bottom side of the spacer, i.e., the exposed surface extending along the narrowest portion of the cutter. Tapers are accordingly formed on the apices of the assembled spacers and cutters and face in opposite directions relative to the cutting surfaces of the cutters. That is, a continuous taper is formed along the bottom side of the broach assembly including along the bottom sides of the lead and lag whereby the depth of the assembly increases in a direction from lead to lag. Thus, as the broach assembly is drawn through the dovetail slot, the cutting edges of the cutters are progressively displaced outwardly relative to the bottom of the slot and against the active surfaces of the slot to progressively cut those surfaces.

Preferably, a multiplicity of shims or precision stock of progressively increasing thicknesses are used to progressively displace the broach assembly in a direction outwardly toward the active surfaces of the slot as the broach assembly is drawn through the slot. For example, by placing a shim in the base of the slot and drawing the broach assembly through the slot, the action of the continuous tapered surface along the bottom of the broach assembly against the shim displaces the cutting edges of the cutters progressively outwardly against the active surfaces of the slot. By replacing the shim with a thicker shim on a subsequent pass or passes of the broach assembly through the slot, additional material is removed from the active surfaces of the slot. Consequently, the active slot surfaces are reestablished, enabling their contact with the active surfaces of the mating part, i.e., the active surfaces of the bucket dovetails.

In a preferred embodiment according to the present invention, there is provided a broach assembly for establishing contact surfaces in a slot of a first part with surfaces of a second part receivable in the slot, comprising a plurality of cutters each having an opening therethrough and cutting surfaces about margins of the cutters, a plurality of spacers each having an opening therethrough and interposed between the cutters, an element passing through the openings and cooperable with the cutters and spacers to form a sub-assembly thereof, a lead and a lag carried by the sub-assembly adjacent opposite ends thereof for respectively leading the sub-assembly into the slot and facilitating withdrawal of the sub-assembly from the slot, the spacers and the cutters having progressively tapered surfaces forming a continuously tapered surface along a side of the sub-assembly and in a direction from the lead toward the lag for engaging a surface in the slot enabling generally oppositely facing cutting surfaces of the cutters to progressively cut the contact surfaces of the slot as the assembly passes through the slot lead end first.

In a further preferred embodiment according to the present invention, there is provided a broach assembly for establishing contact surfaces in a dovetail slot of a turbine wheel with surfaces of a bucket dovetail receivable in the slot, comprising a sub-assembly including a plurality of cutters each having an opening therethrough and cutting surfaces about margins of the cutters and a plurality of spacers each having an opening therethrough and interposed between the cutters, a lead and a lag carried by the sub-assembly adjacent opposite ends thereof for respectively leading the sub-assembly into the slot and facilitating withdrawal of the sub-assembly from the slot, each of the lead, lag, cutters and spacers having a dovetail shape generally corresponding to the shape of the dovetail slot, the spacers and the cutters having apices, the spacers and the cutters having progressively tapered surfaces forming a continuously tapered surface along the apices thereof and in a direction from the lead toward the lag for engaging a surface in the slot enabling generally oppositely facing cutting surfaces of the cutters to progressively cut the contact surfaces of the slot as the assembly passes through the slot lead end first.

In a further preferred embodiment according to the present invention, there is provided a method of progressively cutting surfaces in a slot of a first part to establish contact with mating surfaces of a second part receivable in the slot comprising the steps of providing a sub-assembly of alternating cutters and spacers each having a marginal configuration generally conforming to the configuration of the slot with the spacer margins being inset from the cutter margins, forming a continuously tapered surface along surfaces of the spacers and cutters on a side of the sub-assembly facing generally opposite to cutting surfaces formed on the cutters and passing the sub-assembly through the slot with the tapered surface engaging a surface in the slot and in a direction enabling the cutting surfaces of the cutters to progressively cut the surfaces of the slot to form contact surfaces for engaging the mating surfaces of the second part upon reception of the second part in the cut slot of the first part.

DETAILED DESCRIPTION OF THE INVENTION

Figure 1:
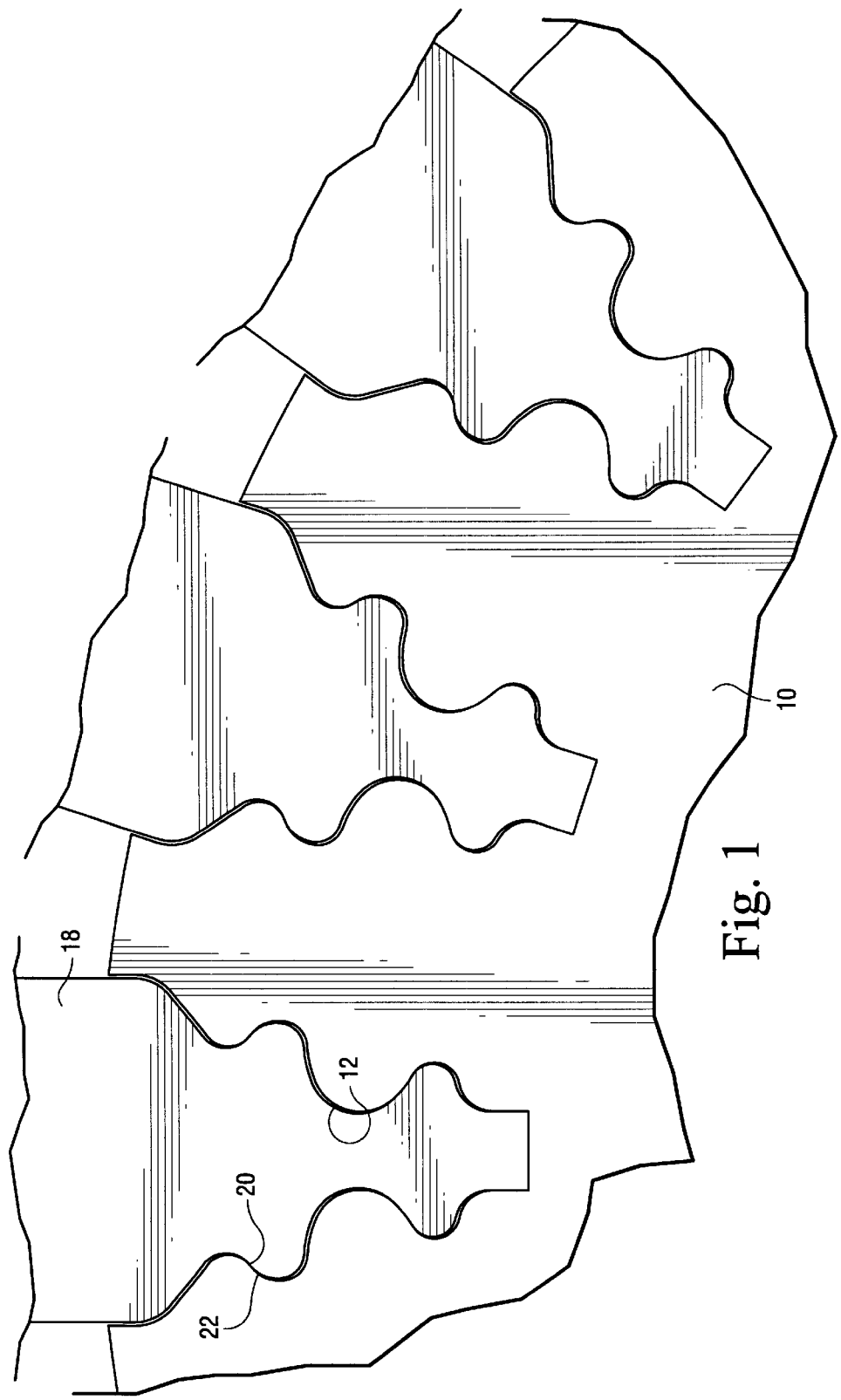
FIG. 1 is an enlarged fragmentary axial elevational view illustrating axial slots in the wheel of a turbine and dovetails in the slots coupling the rotor blades or buckets to the wheel.
Figure 2:
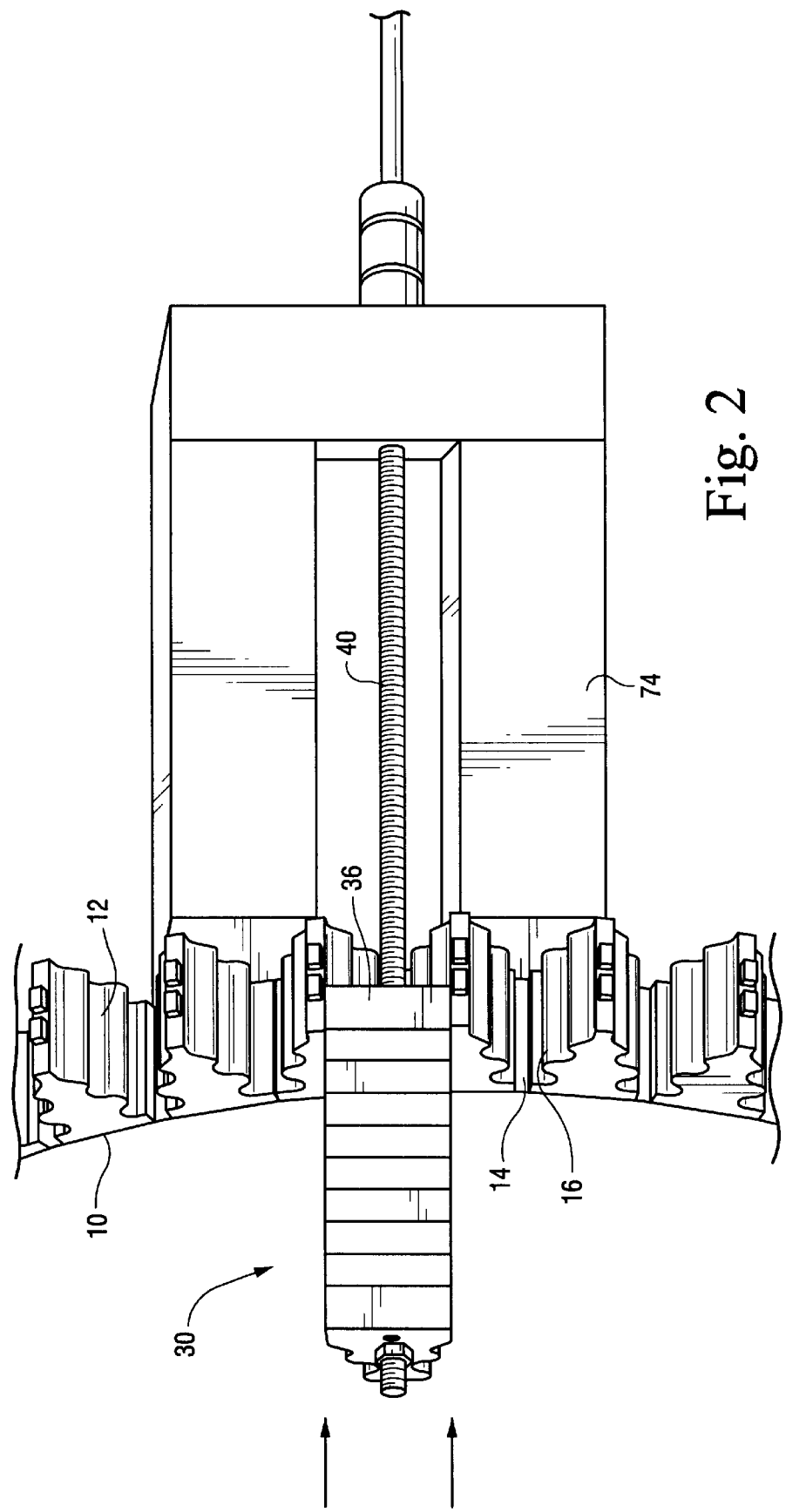
FIG. 2 is a perspective view illustrating a broach assembly aligned for passing through a dovetail slot.
Figure 3:
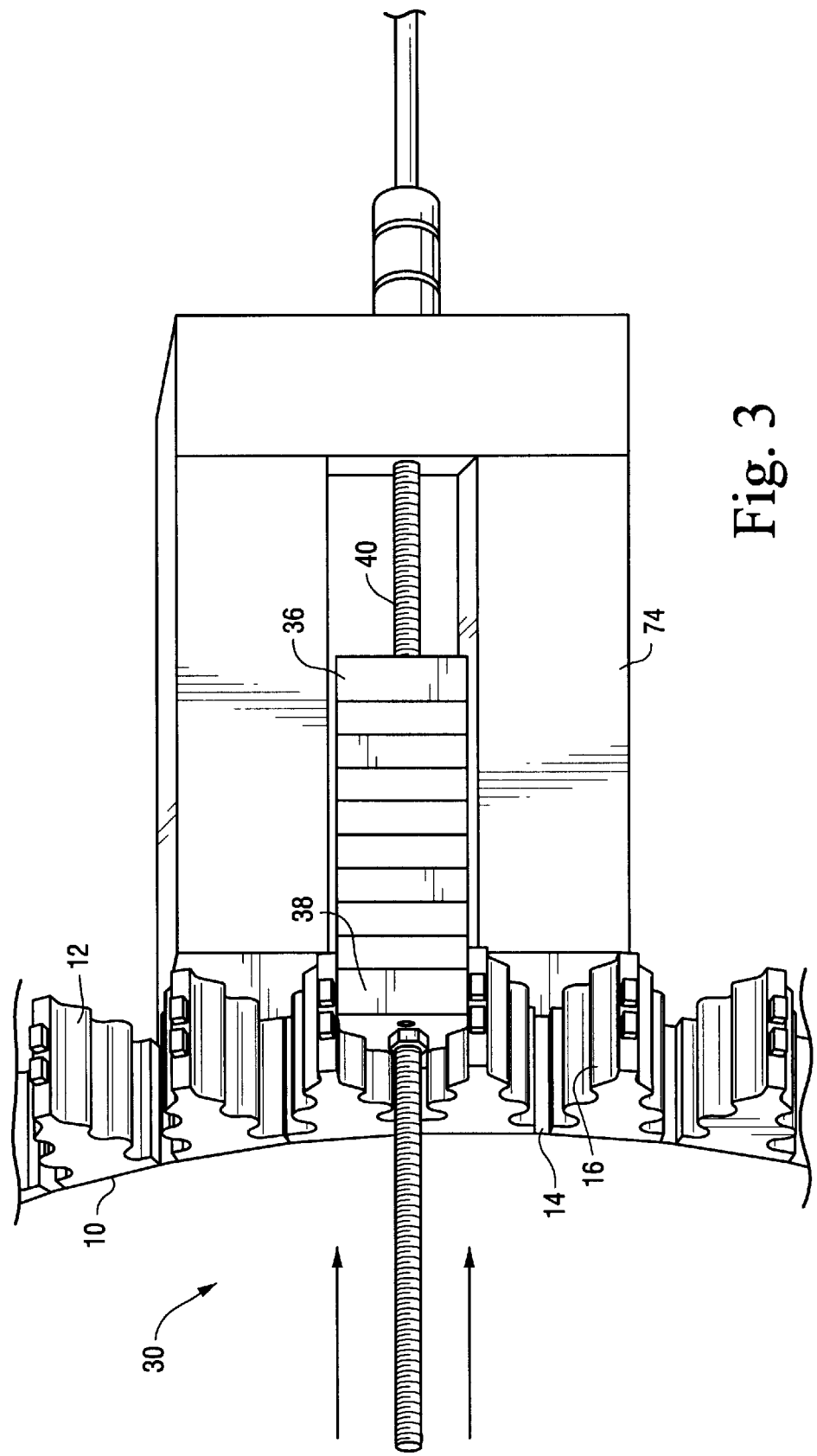
FIG. 3 is a view similar to FIG. 2 illustrating the broach assembly as it completes the pass through the slot.

Referring now to the drawing figures, particularly to FIGS. 1–3, there is illustrated a wheel 10 forming one of the wheels of a gas or steam turbine and having a plurality of generally dovetail-shaped slots 12 spaced circumferentially one from the other about the peripheral margin of the wheel 10. As illustrated, each slot 12 includes a slot bottom 14 and a plurality of ribs 16 along opposite sides of the slot and progressively spaced greater distances from one another from the bottom of the slot 14 radially outwardly to its outermost opening. From a review of FIG. 1, a rotor blade or bucket 18 having a generally corresponding dovetail-shaped configuration at its root as the dovetail configuration of the slot 12 is disposed in each slot 12 about the rotor. It will be appreciated that when the rotor rotates, the outermost surfaces of the ribs 16 of the dovetail slot and those of the bucket dovetails constitute active surfaces 20 and 22, respectively, which tightly bear against one another. The opposing surfaces 24 and 26 of the slot and bucket root, respectively, generally only lightly engage or are spaced relative to one another during operation of the turbine. As noted previously, over time, the active surfaces wear and require refurbishment.

Figure 4:
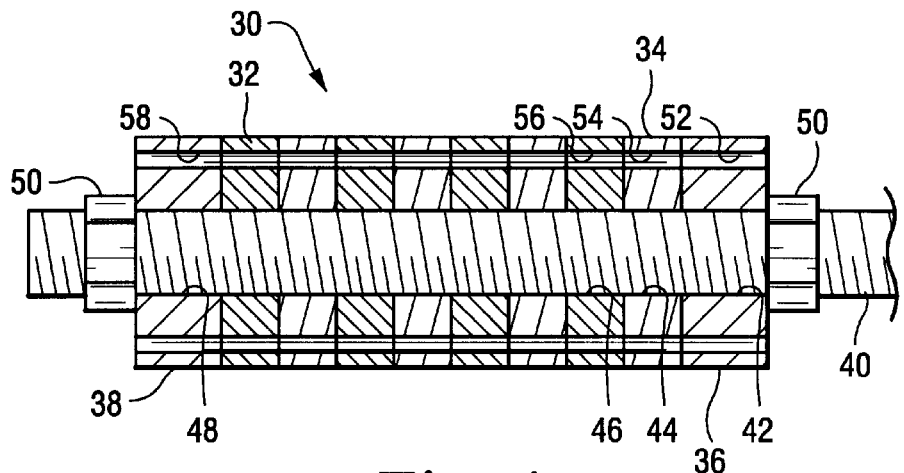
FIG. 4 is a longitudinal cross-sectional view through the broach assembly.

To accomplish this in accordance with a preferred embodiment of the present invention, there is provided a broach assembly, generally designated 30, for establishing contact surfaces in a slot of a first part, i.e., the slot 12 of the turbine wheel 10, with surfaces of a second part, i.e., the root of the turbine blade or bucket received in the dovetail slot. Broach assembly 30 includes a plurality of cutters 32 and a plurality of spacers 34. As illustrated in FIG. 4, the spacers 34 and cutters 32 are arranged alternately in a sub-assembly of cutters and spacers. At the leading end of the broach assembly 30, there is provided a lead 36 and at the trailing end of the broach assembly 30, there is provided a lag 38. Each of the cutters, spacers, lead and lag have a cross-sectional configuration generally corresponding to the dovetail-shape of slot 12. The broach assembly 30 is passed through the slot in one or more multiple passes to refurbish the active surfaces of the slot and may be drawn through by any number of different types of mechanisms, including pneumatic, hydraulic, an electric motor, chain, screw-threaded draw bolts and the like. In the illustrated form, a draw bolt 40 passes through central openings 42, 44, 46 and 48 formed in the lead 36, spacers 34, cutters 32 and lag 38, respectively. Nuts 50 at opposite ends of the broach assembly 30 secure the lead, spacers, cutters and lag in the sub-assembly. Each of the lead, spacers, cutters and lag have aligned apertures 52, 54, 56 and 58 for receiving alignment rods 60. The apertures are provided on opposite sides of the openings receiving the draw bolt 40 and the alignment rods 60 pass through the apertures to maintain the lead, spacers, cutters and lag in accurate alignment relative to one another.

Figure 10:
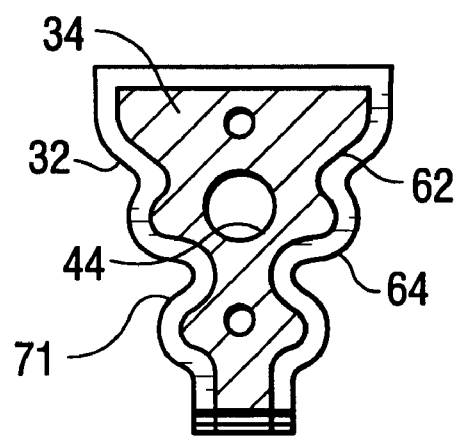
FIG. 10 is a cross-sectional view taken generally about on line 10—10 in FIG. 5.

Referring now to FIG. 10, which is a cross-sectional view through one of the spacers in exaggerated form for illustration purposes, there is illustrated a spacer 34 having margins with the exception of its lower side or bottom margin inset from the margins of the cutter. Particularly, the margins 62 of the spacer 34 are inset along opposite sides from the margins 64 of the cutters 32. With the cutting edges of the cutters along the forward faces of the cutters disposed outwardly of corresponding margins of the spacers, the space between the side faces of the spacers and the surfaces of the dovetail slot being refurbished provide a sufficient volume to receive the chips or cuttings of the material removed from the active dovetail surfaces as the broach assembly is passed through the slot.

Figure 5:
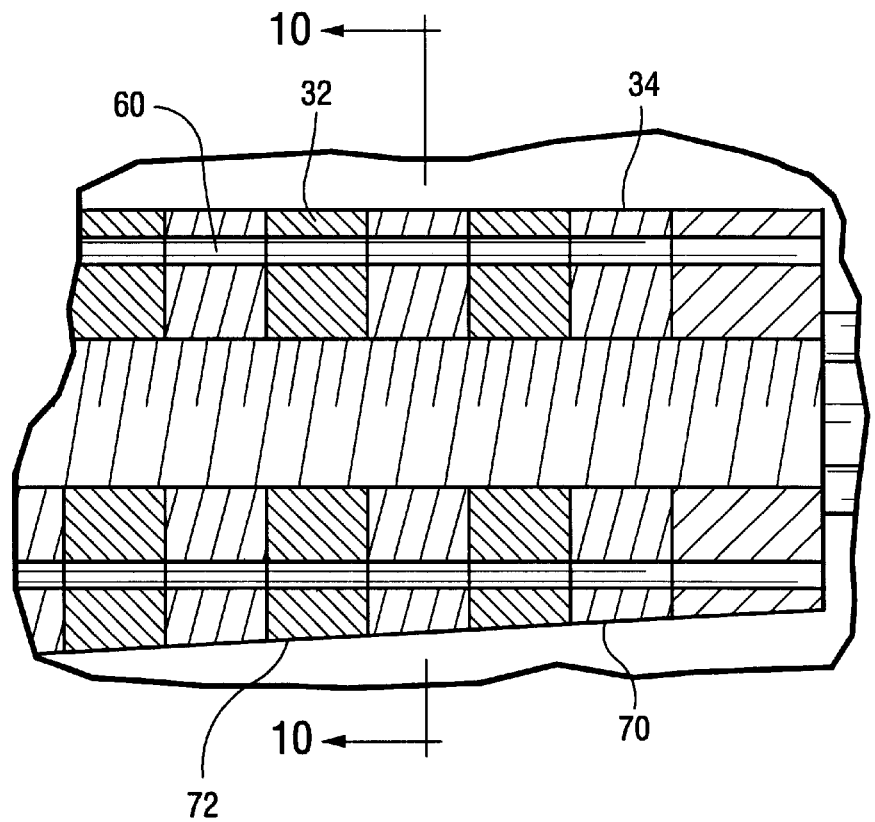
FIG. 5 is an enlarged fragmentary view of a portion of the broach assembly with portions exaggerated for illustrative purposes.

Referring now to the exaggerated view of the cutters and spacers in FIG. 5, it will be appreciated that the lower side or bottom surfaces 70 at the lower apices of the dovetail-shaped spacers 34 have progressively tapered surfaces from the lead to the lag. The corresponding bottom surfaces or apices 72 of the cutters 32 are also progressively tapered. Thus, a continuous tapered surface extends along the bottom of apices of the broach assembly. The continuous tapered surface 70 and 72 extends in a direction from the lead to the lag such that the depth or height of the broach assembly increases in dimension from the lead to the lag from the bottom sides 70 and 72 to the laterally enlarged top side thereof, i.e., in a radial outward direction of the slot.

To use the broach assembly hereof, and referring to FIG. 2, a fixture 74 carries the draw bolt 40 and is positioned on one side of the wheel with the broach assembly 30 located on the opposite side of the wheel 10 with lead 36 disposed in the slot 12. By operating the draw bolt, the broach assembly 30 is drawn through the slot with the continuously tapered spacer surface formed by tapered surfaces 70 and 72 engaging, e.g., along the bottom of the slot in an initial pass. Because of the progressive taper of the spacers and cutters as they are received in and pass through the dovetail slot, the cutting surfaces of the cutters progressively cut the active surfaces of the slot to form the contact surfaces for engaging the mating surfaces of the dovetail-shaped root of the turbine blade or bucket. That is, cutting surfaces on the cutters, i.e., those active cutting surfaces 72 (FIG. 10) are progressively displaced radially outwardly as the broach assembly is drawn through the slot to refurbish the active surfaces 20 of the dovetail slot 12. After the cutters and spacers are passed through the slot, the lag exits the slot and its configuration, generally corresponding to the configuration of the trailing cutter, prevents the broach assembly from being skewed relative to the axial direction of the slot.

Figure 6:
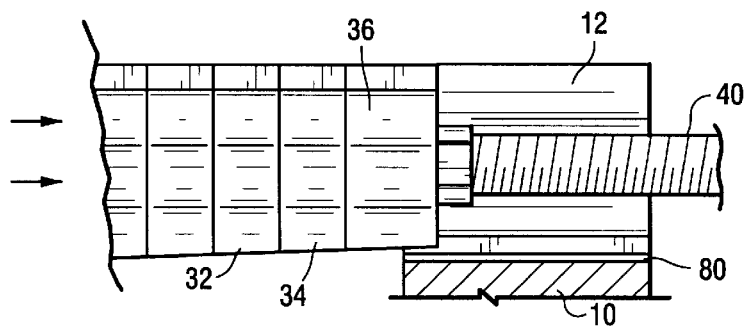
FIGS. 6–9 schematically illustrate the passing of a broach assembly through a slot.
Figure 7:
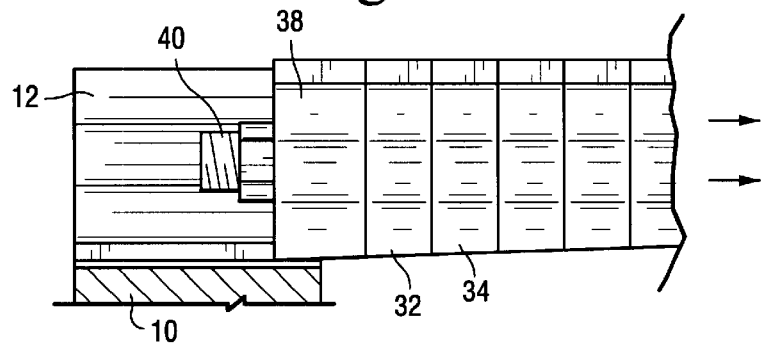

After an initial pass or multiple initial passes of the broach assembly through the slot, the active surfaces 20 of the dovetail slot 12 may be progressively cut by employing shims in the slot. For example, a shim 80 (FIGS. 6–7) may be disposed in the bottom of the slot. The initial shim 80 may have a very small thickness, e.g., 0.0010 inch. When the broach assembly is passed through the slot in a subsequent pass or passes with the apices of the spacers bearing along the shim in the bottom 14 of the slot 12, it will be appreciated that the active cutting surfaces 71 on the cutters 32 remove additional material from the active surfaces 20 of the dovetail slot. That is to say, the broach assembly is elevated or displaced in a radial outward direction by using a shim in the bottom of the slot whereby additional material may be removed from the active dovetail surfaces.

Figure 8:
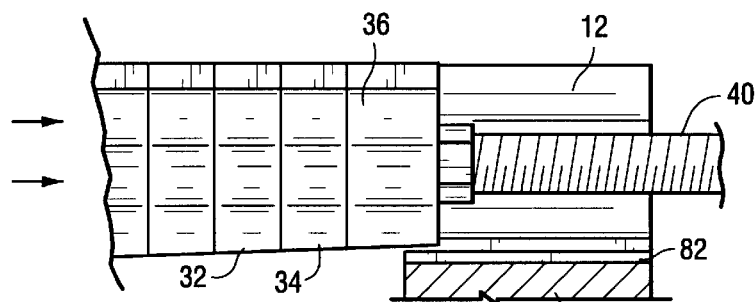
Figure 9:
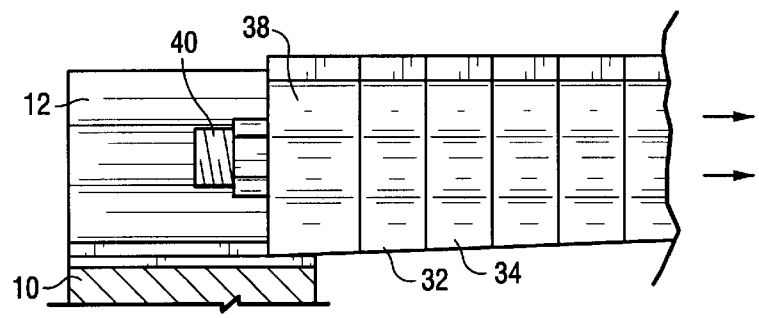

After one or more passes with an initial shim 80 of predetermined thickness, additional passes with one or more additional shims of progressively increasing thicknesses may be provided. Thus, a second shim 82 (FIGS. 8 and 9) having a depth or thickness greater than the depth or thickness of the first shim 80 may be disposed in the slot in lieu of the first shim. Alternatively, an additional shim may be disposed on top of the shim previously placed in the bottom of the slot. In any event, the increased thickness of the additional shim or combined shims displaces the broach assembly in a radial outward direction as it passes through the slot, cutting additional material from the active surfaces of the dovetail slot. It will be appreciated that for each pass of the broach assembly through the slot, the cut material is carried by the broach assembly in the space between adjacent cutters outwardly of the spacer between those cutters. The cut material is preferably removed after each pass. By performing this procedure for each of the dovetail slots about each of the wheels of a turbine, the active surfaces of the dovetail slots may be refurbished for engagement with the active surfaces of the root of the blade or bucket.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A broach assembly for establishing contact surfaces in a slot of a first part with surfaces of a second part receivable in the slot, comprising:

a plurality of cutters each having an opening therethrough and cutting surfaces about margins of the cutters;

a plurality of spacers each having an opening therethrough and interposed between said cutters;

an element passing through said openings and cooperable with the cutters and spacers to form a sub-assembly thereof;

a lead and a lag carried by said sub-assembly adjacent opposite ends thereof for respectively leading the sub-assembly into the slot and facilitating withdrawal of the sub-assembly from the slot;

said spacers and said cutters having progressively tapered surfaces forming a continuously tapered surface along a side of said sub-assembly and in a direction from said lead toward said lag for engaging a surface in said slot enabling generally oppositely facing cutting surfaces of said cutters to progressively cut the contact surfaces of the slot as the assembly passes through the slot lead end first.

2. A broach assembly according to claim 1 including at least one aperture through each of said spacers and cutters and at least one alignment rod passing through said apertures to maintain the cutters and spacers in alignment with one another.

3. A broach assembly according to claim 1 wherein said spacers have margins inset from margins of said cutters enabling a space between the contact surfaces and the spacer margins for collecting material from the contact surfaces.

4. A broach assembly according to claim 1 wherein said cutters and said spacers are alternately disposed in said sub-assembly.

5. A broach assembly according to claim 1 wherein said lead and lag have openings, said support element including a draw bolt passing through said openings of said cutters, spacers, lead and lag and nuts on opposite ends of said draw bolt clamping said cutters, spacers, lead and lag in assembly.

6. A broach assembly according to claim 5 including a pair of apertures through each of said cutters, spacers, lead and lag on opposite sides of said openings and alignment rods through said apertures to maintain the cutters, spacers, lead and lag in alignment with one another.

7. A broach assembly according to claim 1 wherein each of said lead, lag, cutters and spacers has a dovetail shape with an apex, the tapered surfaces lying along the apices of the spacers and cutters.

8. A broach assembly according to claim 1 wherein said assembly in order from said lead to said lag includes said lead, a spacer, alternating cutters and spacers and a final cutter followed by said lag.

9. A broach assembly according to claim 1 including at least one aperture through each of said spacers and cutters and at least one alignment rod passing through said apertures to maintain the cutters and spacers in alignment with one another, said spacers having margins inset from margins of said cutters enabling a space between the contact surfaces and the spacer margins for collecting cut material from the contact surfaces, each of said lead, lag, cutters and spacers having a dovetail shape with an apex, the tapered surfaces lying along the apices of the spacers and cutters.

10. A broach assembly according to claim 1 in combination with a plurality of shims of different thicknesses for sequentially engaging between a bottom surface of the slot and the tapered surfaces of the spacers and cutters as the broach assembly makes respective multiple passes through the slot to progressively cut the contact surfaces of the slot.

11. A broach assembly for establishing contact surfaces in a dovetail slot of a turbine wheel with surfaces of a bucket dovetail receivable in the slot, comprising:

a sub-assembly including a plurality of cutters each having an opening therethrough and cutting surfaces about margins of the cutters and a plurality of spacers each having an opening therethrough and interposed between said cutters;

a lead and a lag carried by said sub-assembly adjacent opposite ends thereof for respectively leading the sub-assembly into the slot and facilitating withdrawal of the sub-assembly from the slot;

each of said lead, lag, cutters and spacers having a dovetail shape generally corresponding to the shape of the dovetail slot, said spacers and said cutters having apices;

said spacers and said cutters having progressively tapered surfaces forming a continuously tapered surface along said apices thereof and in a direction from said lead toward said lag for engaging a surface in the slot enabling generally oppositely facing cutting surfaces of said cutters to progressively cut the contact surfaces of the slot as the assembly passes through the slot lead end first.

12. A broach assembly according to claim 11 including at least one aperture through each of said spacers and cutters and at least one alignment rod passing through said apertures to maintain the cutters and spacers in alignment with one another.

13. A broach assembly according to claim 11 wherein said spacers have margins inset from margins of said cutters enabling a space between the contact surfaces and the spacer margins for collecting material from the contact surfaces.

14. A broach assembly according to claim 11 wherein said cutters and said spacers are alternately disposed in said sub-assembly.

15. A broach assembly according to claim 11 wherein said assembly in order from said lead to said lag includes said lead, a spacer, alternating cutters and spacers and final cutter followed by said lag.

16. A broach assembly according to claim 11 including at least one aperture through each of said spacers and cutters and at least one alignment rod passing through said apertures to maintain the cutters and spacers in alignment with one another, said spacers having margins inset from margins of said cutters enabling a space between the contact surfaces and the spacer margins for collecting material from the contact surfaces.

17. A broach assembly according to claim 11 in combination with a plurality of shims of different thicknesses for sequentially engaging between a bottom of the slot and the tapered surfaces of said spacers and said cutters as the broach assembly makes respective multiple passes through the slot to progressively cut the contact surfaces of the slot.

18. A method of progressively cutting surfaces in a slot of a first part to establish contact with mating surfaces of a second part receivable in the slot comprising the steps of:

providing a sub-assembly of alternating cutters and spacers each having a marginal configuration generally conforming to the configuration of the slot with said spacer margins being inset from the cutter margins;

forming a continuously tapered surface along surfaces of the spacers and cutters on a side of the sub-assembly facing generally opposite to cutting surfaces formed on the cutters; and passing the sub-assembly through the slot with the tapered surface engaging a surface in the slot and in a direction enabling the cutting surfaces of the cutters to progressively cut the surfaces of the slot to form contact surfaces for engaging the mating surfaces of the second part upon reception of the second part in the cut slot of the first part.

19. A method according to claim 18 including providing a lead on said sub-assembly having a marginal configuration inset from margins of said cutters to facilitate insertion of the sub-assembly into the slot and inserting the sub-assembly into the slot lead end first.

20. A method according to claim 18 including providing a lag on said sub-assembly having a marginal configuration corresponding to the marginal configuration of the cutters.

21. A method according to claim 18 including providing a lead on said sub-assembly having a marginal configuration inset from margins of said cutters to facilitate insertion of the sub-assembly into the slot and inserting the sub-assembly into the slot lead end first, and providing a lag on said sub-assembly having a marginal configuration greater than the marginal configuration of said lead.

22. A method according to claim 18 including providing said cutters and spacers with a generally dovetail configuration about margins thereof.

23. A method according to claim 18 including forming an opening through each of said cutters and spacers, passing a bolt through the openings and securing said bolt to said sub-assembly to maintain said cutters and spacers in said sub-assembly.

24. A method according to claim 18 including forming an aperture through each of said cutters and said spacers and passing a rod through said apertures to maintain said cutters and said spacers in alignment relative to one another.

25. A method according to claim 18 including providing multiple shims of progressively increasing thicknesses, inserting shims of progressively increasing thicknesses into a base of the slot, and displacing the sub-assembly through the slot to engage the shims of increasing thicknesses during respective multiple passes of the sub-assembly.

\* \* \* \* \*